United States Patent
Nagata et al.

(10) Patent No.: US 8,870,152 B2
(45) Date of Patent: Oct. 28, 2014

(54) SOLENOID-DRIVEN FLOW CONTROL VALVE

(75) Inventors: Kiyokazu Nagata, Tokyo (JP); Keigo Yasuda, Sagamihara (JP); Masatoshi Fujise, Saitama (JP)

(73) Assignee: Kayaba Industry Co., Ltd., Tokyo (JP)

( * ) Notice: Subject to any disclaimer, the term of this patent is extended or adjusted under 35 U.S.C. 154(b) by 631 days.

(21) Appl. No.: 12/735,471

(22) PCT Filed: Dec. 4, 2009

(86) PCT No.: PCT/JP2009/070718
§ 371 (c)(1),
(2), (4) Date: Jul. 20, 2010

(87) PCT Pub. No.: WO2010/067853
PCT Pub. Date: Jun. 17, 2010

(65) Prior Publication Data
US 2010/0294380 A1 Nov. 25, 2010

(30) Foreign Application Priority Data
Dec. 9, 2008 (JP) .................................. 2008-312983

(51) Int. Cl.
*F16K 31/02* (2006.01)
*F16K 31/40* (2006.01)

(52) U.S. Cl.
CPC ..... *F16K 31/408* (2013.01); *F15B 2211/50572* (2013.01); *F15B 2211/413* (2013.01); *F15B 2211/40569* (2013.01)
USPC ........................................................ 251/30.04

(58) Field of Classification Search
CPC . F16K 31/124; F16K 31/1245; F16K 31/406; F16K 31/408
USPC ........... 251/29, 30.01–30.05; 137/493, 493.1, 137/493.3, 493.6, 493.7
See application file for complete search history.

(56) References Cited

U.S. PATENT DOCUMENTS

| | | | | | |
|---|---|---|---|---|---|
| 2,665,708 | A | * | 1/1954 | Ghormley | ...................... 137/493 |
| 2,758,811 | A | * | 8/1956 | Peterson | ......................... 251/29 |
| 2,783,019 | A | * | 2/1957 | Houghton | .................. 251/30.02 |
| 3,905,575 | A | * | 9/1975 | Zeuner et al. | ................... 251/29 |
| 3,954,249 | A | * | 5/1976 | Gratzmuller | .................... 251/29 |

(Continued)

FOREIGN PATENT DOCUMENTS

| JP | 52-090814 A | 7/1977 |
|---|---|---|
| JP | 11-082801 A | 3/1999 |

(Continued)

*Primary Examiner* — Eric Keasel
(74) *Attorney, Agent, or Firm* — Rabin & Berdo, P.C.

(57) ABSTRACT

A working fluid flow rate flowing from a second port (13) to a first port (12) is controlled using a solenoid (S). A pilot pin (60) of a pilot valve (V3) driven by the solenoid (S) regulates an auxiliary pilot pressure. An opening of an auxiliary valve (V2) is varied according to the auxiliary pilot pressure, whereby the auxiliary valve (V2) causes working oil to flow out to the first port (12) from the second port (13) and varies a main pilot pressure according to the working oil flow rate. An opening of a main valve (V1) is varied according to the main pilot pressure, whereby the main valve (V1) causes the working oil to flow out to the first port (12) from the second port (13). Precise flow control at a low flow rate and responsive flow control at a high flow rate are thereby realized.

17 Claims, 9 Drawing Sheets

(56) References Cited

U.S. PATENT DOCUMENTS

| | | | |
|---|---|---|---|
| 4,201,362 A * | 5/1980 | Nishimi et al. | 251/29 |
| 4,494,726 A * | 1/1985 | Kumar et al. | 251/29 |
| 4,699,351 A * | 10/1987 | Wells | 251/29 |
| 6,328,275 B1 | 12/2001 | Yang et al. | |
| 6,974,114 B2 * | 12/2005 | Hwang | 251/26 |
| 7,028,975 B2 * | 4/2006 | Lee et al. | 251/26 |
| 7,621,211 B2 * | 11/2009 | Ma et al. | 91/446 |
| 8,256,739 B2 * | 9/2012 | Pfaff | 251/29 |
| 2005/0035320 A1 | 2/2005 | Tsuchiya et al. | |
| 2007/0157980 A1 * | 7/2007 | Stephenson et al. | 137/625.64 |
| 2007/0210270 A1 * | 9/2007 | Stephenson et al. | 251/38 |
| 2007/0290152 A1 * | 12/2007 | Ma et al. | 251/30.01 |

FOREIGN PATENT DOCUMENTS

| | | |
|---|---|---|
| JP | 2001-066020 A | 3/2001 |
| JP | 2002-039429 A | 2/2002 |
| JP | 2002-106743 A | 4/2002 |
| JP | 2003-185052 A | 7/2003 |
| JP | 2007-239996 A | 9/2007 |
| JP | 2008-128402 A | 6/2008 |

* cited by examiner

SOLENOID-DRIVEN FLOW CONTROL VALVE

TECHNICAL FIELD OF THE INVENTION

This invention relates to a solenoid-driven flow control valve that varies a flow rate of a fluid in response to a thrust of an energized solenoid.

BACKGROUND OF THE INVENTION

JP2002-106743A, published by the Japan Patent Office in 2002, and JP2007-239996A, published by the Japan Patent Office in 2007, disclose solenoid-driven flow control valves that vary a sectional area of a flow passage sectional area of a valve in response to a thrust of an energized solenoid.

These conventional solenoid-driven flow control valves include a poppet that displaces in response to a pilot pressure, and vary the sectional area of a valve opening portion formed between the poppet and a valve seat in order to transmit a fluid in accordance with the displacement of the poppet. The pilot pressure is adjusted using a pilot pin that is displaced by the thrust of the energized solenoid. When the sectional area of the valve opening portion varies, a flow resistance of the valve varies, and as a result, a flow rate of the fluid flowing through the valve varies.

SUMMARY OF THE INVENTION

In the conventional solenoid-driven flow control valves described above, it is difficult to realize both response at a high flow rate and control precision at a low flow rate. For example, to improve response at a high flow rate, the poppet may be increased in size so that the sectional area of the opening portion varies greatly with a small displacement of the poppet. However, when the sectional area of the opening portion varies greatly with a small displacement of the poppet, a displacement unit of the poppet becomes excessively small during control at a low flow rate. In other words, it is extremely difficult to determine a ratio between the displacement of the poppet and the sectional area variation of the opening portion such that both response at a high flow rate and control precision at a low flow rate are satisfied.

It is therefore an object of this invention to provide a solenoid-driven flow control valve that is capable of realizing both response at a high flow rate and control precision at a low flow rate.

To achieve the above object, this invention provides a solenoid-driven flow control valve for controlling a flow rate of a fluid that flows from a second port to a first port in response to an energizing current. The valve comprises a main valve interposed between the second port and the first port, the main valve comprising a main valve seat and a main poppet facing the main valve seat to be capable of being seated thereon, a main pilot chamber exerting a fluid pressure on the main poppet toward the main valve seat, a main pilot orifice connecting the main pilot chamber to the second port, an auxiliary valve connecting the main pilot chamber to the first port, the auxiliary valve comprising an auxiliary valve seat and an auxiliary poppet facing the auxiliary valve seat to be capable of being seated thereon, an auxiliary pilot chamber exerting a fluid pressure on the auxiliary poppet toward the auxiliary valve seat, an auxiliary pilot orifice connecting the auxiliary pilot chamber to the second port, a pilot valve connecting the auxiliary pilot chamber to the first port, the pilot valve comprising a pilot valve seat and a pilot pin facing the pilot valve seat to be capable of being seated thereon, and a solenoid causing the pilot pin to move toward and away from the auxiliary valve seat in response to the energizing current.

The details as well as other features and advantages of this invention are set forth in the remainder of the specification and are shown in the accompanying drawings.

DESCRIPTION OF THE PREFERRED EMBODIMENTS

Figure 1:
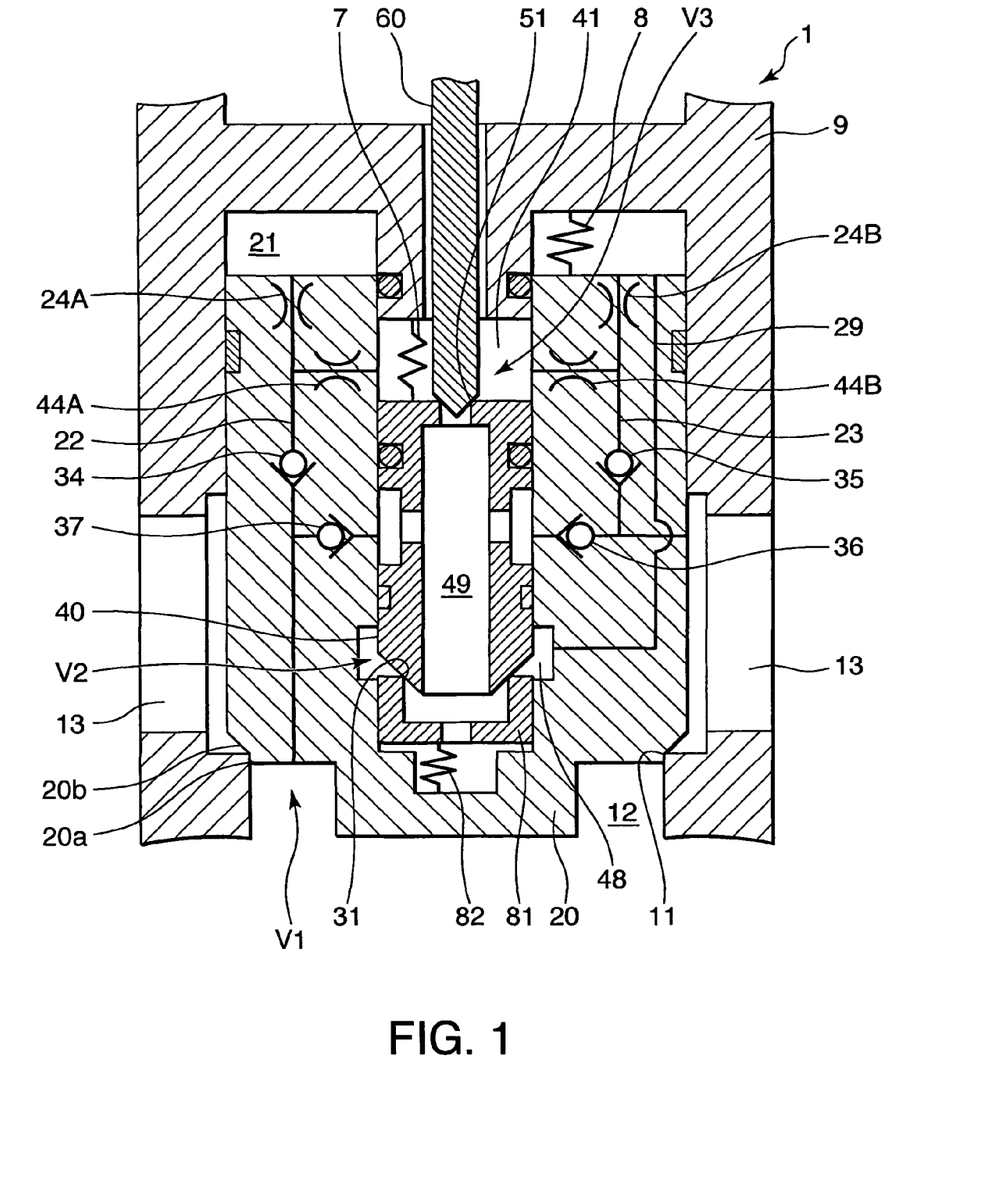
FIG. 1 is a schematic diagram of a solenoid-driven flow control valve according to this invention.

Referring to FIG. 1 of the drawings, a solenoid-driven flow control valve 1 is a valve that controls a flow rate of a fluid flowing between a first port 12 and a second port 13 in response to an energizing current of a solenoid. In this embodiment, working oil is used as the fluid.

When a pressure of the first port 12 is higher than a pressure of the second port 13, the solenoid-driven flow control valve 1 causes the working oil to flow from the first port 12 to the second port 13 and controls the flow rate thereof. In this case, the first port 12 is referred to as a high pressure port and the second port 13 is referred to as a low pressure port. Conversely, when the pressure of the second port 13 is higher than the pressure of the first port 12, the solenoid-driven flow control valve 1 causes the working oil to flow from the second port 13 to the first port 12 and controls the flow rate thereof. In this case, the second port 13 is referred to as the high pressure port and the first port 12 is referred to as the low pressure port. In other words, the solenoid-driven flow control valve 1 is a bidirectional flow control valve.

The first port 12 and second port 13 are formed in a valve housing 9. For example, the first port 12 is connected to a hydraulic source, and the second port 13 is connected to a hydraulic load that consumes oil pressure from the hydraulic source. The second port 13 may be connected to a hydraulic pump, and the first port 12 may be connected to the hydraulic load.

Three valves, namely a main valve V1, an auxiliary valve V2, and a pilot valve V3, are provided in the interior of the solenoid-driven flow control valve 1.

The main valve V1 includes an annular main valve seat 11 formed in the valve housing 9 so as to face the first port 12, and a cylindrical main poppet 20 that is seated on the main valve seat 11 from the inside of the valve housing 9. The main poppet 20 is fitted to the valve housing 9 to be free to slide in an axial direction. The second port 13 opens into the valve housing 9 so as to face a side surface of the main poppet 20.

The main poppet 20 is formed with a tapered portion 20b that is seated on the main valve seat 11, and a cylindrical portion 20a that is formed on a tip end of the tapered portion 20b so as to slide along an inner peripheral surface of the main valve seat 11.

When the cylindrical portion 20a of the main poppet 20 slides along the inner peripheral surface of the main valve seat 11 so that the tapered portion 20b contacts the main valve seat 11, the main poppet 20 is seated on the valve seat 11. When the main poppet 20 is seated on the main valve seat 11, the working oil is prevented from flowing from the first port 12 to the second port 13 and from the second port 13 to the first port 12. When the main poppet 20 is lifted from the main valve seat 11, on the other hand, an annular gap is formed between the main poppet 20 and the main valve seat 11, and the working oil flows between the first port 12 and the second port 13 via the annular gap. The main poppet 20 varies a lift amount from the main valve seat 11 by displacing in an axial direction within the valve housing 9, whereby a sectional area of the annular gap, or in other words an opening sectional area, is varied.

When seated on the main valve seat 11, the main poppet 20 includes a circular pressure-receiving portion that is exposed to the first port 12 on the inside of the main valve seat 11 and an annular pressure-receiving portion that is exposed to the second port 13 on the outside of the main valve seat 11. A pressure of the first port 12 or the second port 13 acts on the pressure-receiving portions to bias the main poppet 20 in a lift direction, or in other words a valve opening direction.

By setting an outer diameter D20 of the main poppet 20 and an inner diameter D11 of the valve seat 11 such that a following Equation (1) is satisfied, a pressure-receiving surface area of the main poppet 20 in the first port 12 equals a pressure-receiving surface area thereof in the second port 13.

$$D20:D11=\sqrt{2}:1 \tag{1}$$

A main pilot chamber 21 is formed in the valve housing 9 to face a back surface of the main poppet 20. The main pilot chamber 21 is connected to the first port 12 via a check valve 34 and a main pilot orifice 24A. The main pilot chamber 21 is connected to the second port 13 via a check valve 35 and an orifice 24B. The figure shows two main pilot orifices 24A and 24B, but by merging a downstream passage 22 of the check valve 34 and a downstream passage 23 of the check valve 35, the two main pilot orifices 24A and 24B may be replaced by a single main pilot orifice. The check valve 34 blocks an outflow of working oil from the main pilot chamber 21 to the first port 12, and the check valve 35 blocks an outflow of working oil from the main pilot chamber 21 to the second port 13. As a result, the pressure of the high pressure port, from among the first port 12 and the second port 13, is introduced into the main pilot chamber 21 via the main pilot orifice 24A or 24B.

The main poppet 20 is biased toward the main valve seat 11, or in other words in a valve closing direction, by a main pilot pressure of the main pilot chamber 21.

A main return spring 8 that biases the main poppet 20 in the valve closing direction is interposed between the valve housing 9 and the main poppet 20.

When a valve opening force exerted on the main poppet 20 by the working oil pressure of the first port 12 or the second port 13 exceeds a valve closing force exerted on the main poppet 20 by the main pilot pressure of the main pilot chamber 21 and a spring force of the main return spring 8, the main poppet 20 is lifted from the main valve seat 11.

The auxiliary valve V2 is a valve that controls the main pilot pressure of the main pilot chamber 21. The auxiliary valve V2 is provided on the inside of the main poppet 20.

The auxiliary valve V2 includes an annular auxiliary valve seat 31 provided on the inside of the main poppet 20, and an auxiliary poppet 40 that is fitted to a central portion of the main poppet 20 to be capable of sliding in the axial direction in a concentric position with the main poppet 20.

A pressure chamber 48 that surrounds a tip end of the auxiliary poppet 40 is formed on the outside of the auxiliary valve seat 31 on the inside of the main poppet 20. The pressure chamber 48 communicates with the main pilot chamber 21 at all times via a passage 29 formed in the main poppet 20. A pressure of the pressure chamber 48 biases the auxiliary poppet 40 in a lift direction from the auxiliary valve seat 31, or in other words a valve opening direction.

The auxiliary valve seat 31 is formed on a tip end of a cylindrical pressure compensation sleeve 81. The pressure compensation sleeve 81 is fitted into a sliding hole formed coaxially with the auxiliary poppet 40 on the inside of the main poppet 20, whereby the pressure compensation sleeve 81 is capable of sliding in the axial direction in a state where the auxiliary valve seat 31 faces the auxiliary poppet 40. A spring 82 that elastically supports the auxiliary valve seat 31 toward the auxiliary poppet 40 is interposed between the auxiliary valve seat 31 and the main poppet 20. An action of the pressure compensation sleeve 81 will be described below.

A cylindrical inner chamber 49 is formed on the inside of the auxiliary poppet 40. The inner chamber 49 includes an opening portion that opens onto a side face of the auxiliary poppet 40. Thus, the inner chamber 49 communicates with the second port 13 via a check valve 36 connected to the opening portion and communicates with the first port 12 via a check valve 37 likewise connected to the opening portion. When the auxiliary poppet 40 is seated on the auxiliary valve seat 31, the inner chamber 49 is blocked from the pressure chamber 48, but when the auxiliary poppet 40 is lifted from the auxiliary valve seat 31, the inner chamber 49 communicates with the pressure chamber 48 via an annular gap formed between the auxiliary valve seat 31 and the auxiliary poppet 40. The check valve 36 prevents the working oil from flowing into the inner chamber 49 from the second port 13, and the check valve 37 prevents the working oil from flowing into the inner chamber 49 from the first port 12. With the constitution described above, the inner chamber 49 allows a desired amount of working oil to flow into the low pressure port, from among the second port 13 and the first port 12, via the check valve 36 or the check valve 37.

An auxiliary pilot chamber 41 is formed on the inside of the main poppet 20 so as to face a back surface of the auxiliary poppet 40. The auxiliary pilot chamber 41 is connected to the check valve 34 via an auxiliary pilot orifice 44A. Further, the auxiliary pilot chamber 41 is connected to the check valve 35 via an auxiliary pilot orifice 44B. The figure shows two auxiliary pilot orifices 44A and 44B, but by merging the downstream passage 22 of the check valve 34 and the downstream passage 23 of the check valve 35, the two auxiliary pilot orifices 44A and 44B may be replaced by a single auxiliary pilot orifice.

The auxiliary poppet 40 is biased toward the auxiliary valve seat 31, or in other words in a valve closing direction, by an auxiliary pilot pressure of the auxiliary pilot chamber 41.

An auxiliary return spring 7 that biases the auxiliary poppet 40 in the valve closing direction is interposed between the housing 9 and the auxiliary poppet 40.

A pressure that is led from the main pilot chamber 21 to the pressure chamber 48 via the passage 29 acts on the auxiliary poppet 40 as a valve opening force. When the valve opening force exceeds a valve closing force exerted on the auxiliary poppet 40 by the pressure of the auxiliary pilot chamber 41 and a spring force of the auxiliary return spring 7, the auxiliary poppet 40 is lifted from the auxiliary valve seat 31.

When the auxiliary poppet 40 is lifted from the auxiliary valve seat 31, the pressure chamber 48 communicates with the inner chamber 49. When the pressure chamber 48 communicates with the inner chamber 49, the working oil in the main pilot chamber 21 passes through the passage 29, the pressure chamber 48 and the inner chamber 49, and flows out to the low pressure port, from among the second port 13 and the first port 12, via the check valve 36 or the check valve 37. As a result, the pressure of the main pilot chamber 21 decreases by an amount corresponding to a differential pressure generated by the orifices 24A, 24B. The pressure in the main pilot chamber 21 decreases by a steadily greater amount as the lift amount of the auxiliary poppet 40, or in other words an opening of the auxiliary valve V2, increases. In other words, as the opening of the auxiliary valve V2 increases, the valve closing force acting on the main poppet 20 of the main valve V1 decreases, leading to an increase in the opening of the main valve V1 relative to the pressure of the high pressure port.

The pilot valve V3 is a valve that controls the auxiliary pilot pressure of the auxiliary pilot chamber 41. The pilot valve V3 is provided between the auxiliary pilot chamber 41 and the inner chamber 49. The pilot valve V3 includes a pilot valve seat 51 that is formed to penetrate an upper end portion of the auxiliary poppet 40, and a pilot pin 60 that penetrates the auxiliary pilot chamber 41 longitudinally so as to be seated on the pilot valve seat 51.

When the pilot pin 60 is seated on the pilot valve seat 51, the pilot valve V3 blocks communication between the auxiliary pilot chamber 41 and the inner chamber 49. When the pilot pin 60 is lifted from the pilot valve seat 51, working oil in the auxiliary pilot chamber 41 flows out to the inner chamber 49 and then flows into the low pressure port, from among the second port 13 and the first port 12, via the check valve 36 or the check valve 37. As a result, the pressure of the auxiliary pilot chamber 41 decreases by an amount corresponding to a differential pressure between the orifices 44A, 44B. The pressure in the auxiliary pilot chamber 41 decreases by a steadily greater amount as the lift amount of the pilot pin 60, or in other words an opening of the pilot valve V3, increases. In other words, as the opening of the pilot valve V3 increases, the valve closing force acting on the auxiliary poppet 20 of the auxiliary valve V2 decreases, leading to an increase in the opening of the auxiliary valve V2 relative to the pressure of the high pressure port.

The pilot pin 60 is driven by a solenoid. A driving structure for driving the pilot pin 60 using the solenoid will be described below.

Figure 4:
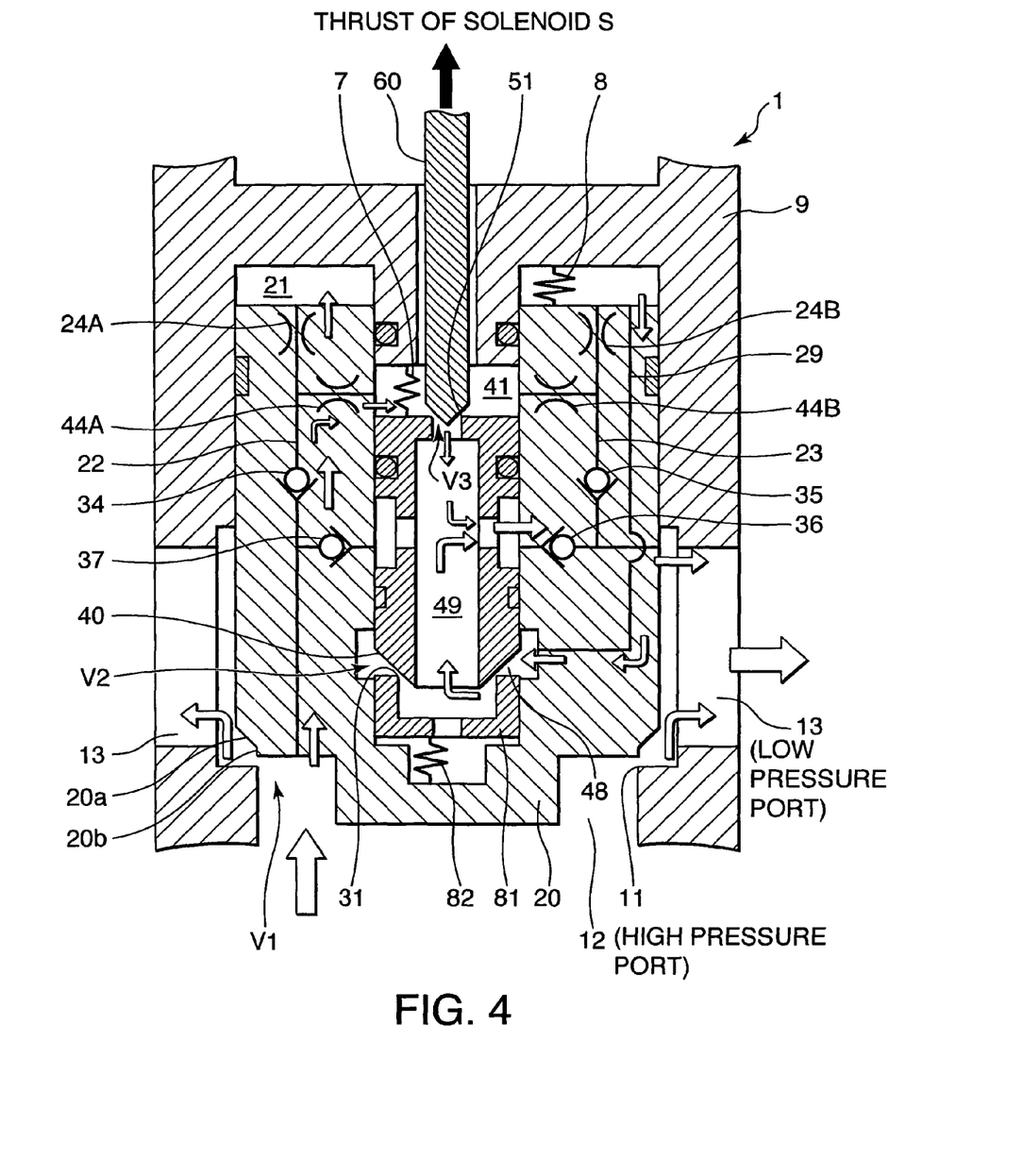
FIG. 4 is a schematic diagram of the solenoid-driven flow control valve, showing a flow of working oil in one direction.

Referring to FIG. 4, an operation of the solenoid-driven flow control valve 1 relating to a working oil flow from the first port 12 to the second port 13 will now be described.

In the figure, the first port 12 is the high pressure port and the second port 13 is the low pressure port. The solenoid-driven flow control valve 1 causes the working oil to flow from the first port 12 to the second port 13 while controlling the flow rate thereof.

When the solenoid is energized such that the pilot pin 60 is lifted from the pilot valve seat 51, the working oil flows from the first port 12 into the auxiliary pilot chamber 41 through the check valve 34 and the auxiliary pilot orifice 44A, then flows into the inner chamber 49, and then flows out to the second port 13 through the check valve 36. At this time, the pressure of the first port 12 serving as the high pressure port is led into the main pilot chamber 21 via the main pilot orifice 24A.

In this fashion, the pilot valve V3 causes the working oil to flow from the first port 12 to the second port 13. When the flow rate of the pilot valve V3 increases, the pressure of the auxiliary pilot chamber 41 decreases relative to the pressure of the first port 12. As a result, the valve closing force acting on the auxiliary poppet 40 decreases, and when the pressure of the main pilot chamber 21, which acts on the pressure chamber 48 via the passage 29, exceeds the valve closing force of the auxiliary poppet 40, the auxiliary poppet 40 is lifted from the auxiliary valve seat 31, thereby opening the auxiliary valve V2.

When the auxiliary valve V2 opens, a flow of working oil is formed from the main pilot chamber 21 to the second port 13 via the passage 29, the pressure chamber 48, the inner chamber 49, and the check valve 36. In other words, with respect to the working oil flow from the first port 12 to the second port 13, a flow passing through the pilot valve V3 and a flow passing through the auxiliary valve V2 are formed.

When the flow rate of the auxiliary valve V2, or in other words the flow rate of the working oil that flows from the first port 12 into the second port 13 via the main pilot chamber 21, increases, the pressure of the main pilot chamber 21 decreases relative to the pressure of the first port 12. As a result, the valve closing force acting on the main poppet 20 decreases, and when the valve opening force exerted on the main poppet 20 by the working oil in the first port 12 exceeds the valve closing force acting on the main poppet 20, the main poppet 20 is lifted from the main valve seat 11, causing the main valve V1 to open.

When the main valve V1 opens, a flow of working oil that flows from the first port 12 directly into the second port 13 through the gap between the main poppet 20 and the main valve seat 11 is formed. Hence, with respect to the working oil flow from the first port 12 to the second port 13, the flow passing through the pilot valve V3, the flow passing through the auxiliary valve V2, and a flow passing through the main valve V1 are formed.

Figure 5:
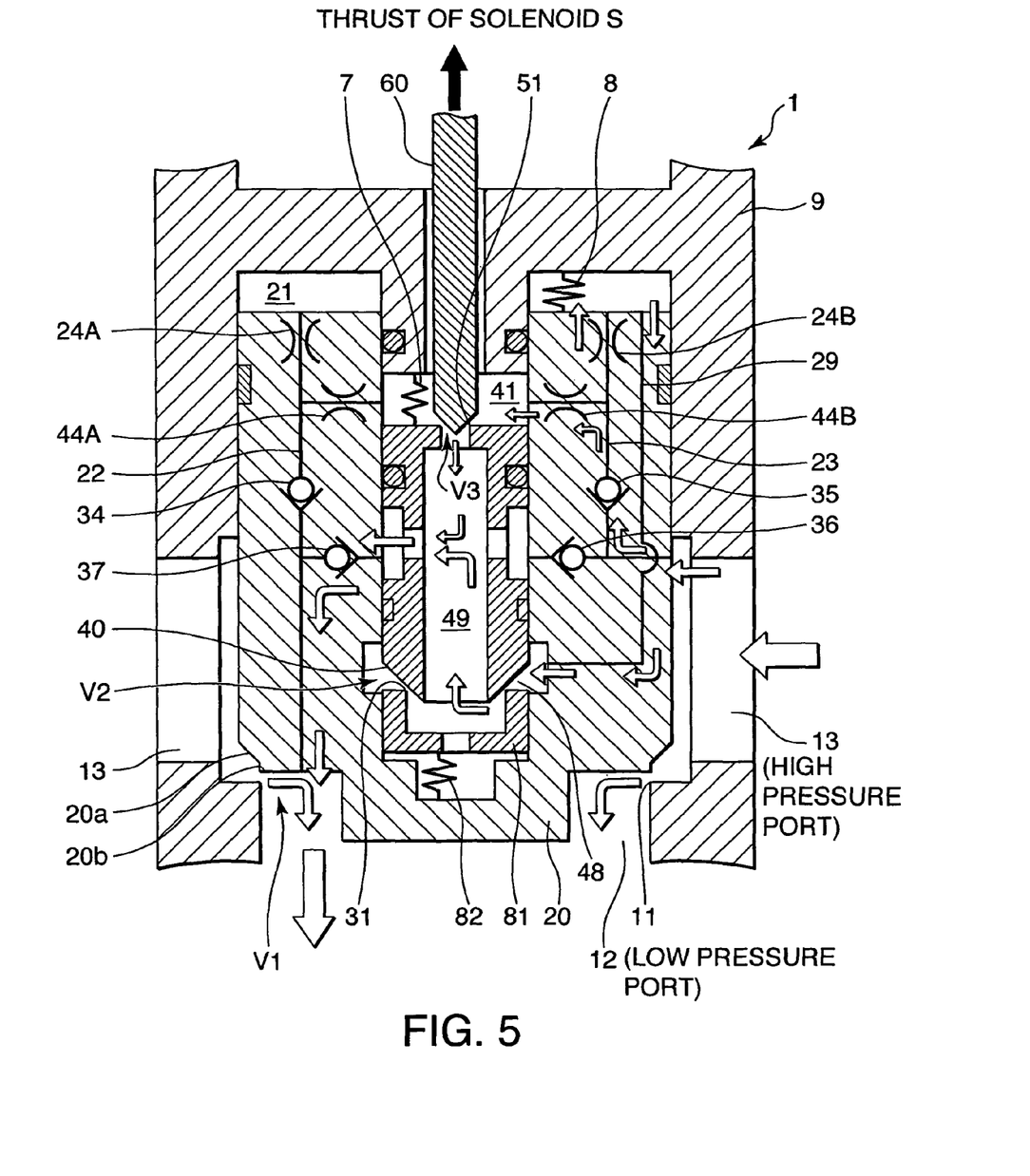
FIG. 5 is a schematic diagram of the solenoid-driven flow control valve, showing a flow of working oil in an opposite direction.

Referring to FIG. 5, an operation of the solenoid-driven flow control valve 1 relating to a working oil flow from the second port 13 to the first port 12 will now be described.

In the figure, the second port 13 is the high pressure port and the first port 12 is the low pressure port. The solenoid-driven flow control valve 1 causes the working oil to flow from the second port 13 to the first port 12 while controlling the flow rate thereof.

When the solenoid is energized such that the pilot pin 60 is lifted from the pilot valve seat 51, the working oil flows from the second port 13 into the auxiliary pilot chamber 41 through the check valve 35 and the auxiliary pilot orifice 44B, then flows into the inner chamber 49 via the pilot valve V3, and then flows out to the first port 12 through the check valve 37. At this time, the pressure of the second port 13 is led into the main pilot chamber 21 via the main pilot orifice 24B.

In this fashion, the pilot valve V3 causes the working oil to flow from the second port 13 to the first port 12. When the flow rate of the pilot valve V3 increases, the pressure of the auxiliary pilot chamber 41 decreases relative to the pressure of the second port 13. As a result, the valve closing force acting on the auxiliary poppet 40 decreases, and when the pressure of the main pilot chamber 21, which acts on the pressure chamber 48 via the passage 29, exceeds the valve closing force acting on the auxiliary poppet 40, the auxiliary poppet 40 is lifted from the auxiliary valve seat 31, causing the auxiliary valve V2 to open.

When the auxiliary valve V2 opens, a flow of working oil is formed from the main pilot chamber 21 to the first port 12 via the passage 29, the pressure chamber 48, the inner chamber 49, and the check valve 37. In other words, with respect to the working oil flow from the second port 13 to the first port 12, a flow passing through the pilot valve V3 and a flow passing through the auxiliary valve V2 are formed.

When the flow rate of the auxiliary valve V2, or in other words the flow rate of the working oil that flows from the second port 13 into the first port 12 via the main pilot chamber 21, increases, the pressure of the main pilot chamber 21 decreases relative to the pressure of the second port 13. As a result, the valve closing force acting on the main poppet 20 decreases, and when the valve opening force exerted on the main poppet 20 by the working oil in the second port 13 exceeds the valve closing force acting on the main poppet 20, the main poppet 20 is lifted from the main valve seat 11, causing the main valve V1 to open.

When the main valve V1 opens, a flow of working oil that flows from the second port 13 directly into the first port 12 through the gap between the main poppet 20 and the main valve seat 11 is formed. Hence, with respect to the working oil flow from the second port 13 to the first port 12, the flow passing through the pilot valve V3, the flow passing through the auxiliary valve V2, and a flow passing through the main valve V1 are formed.

Figure 6:
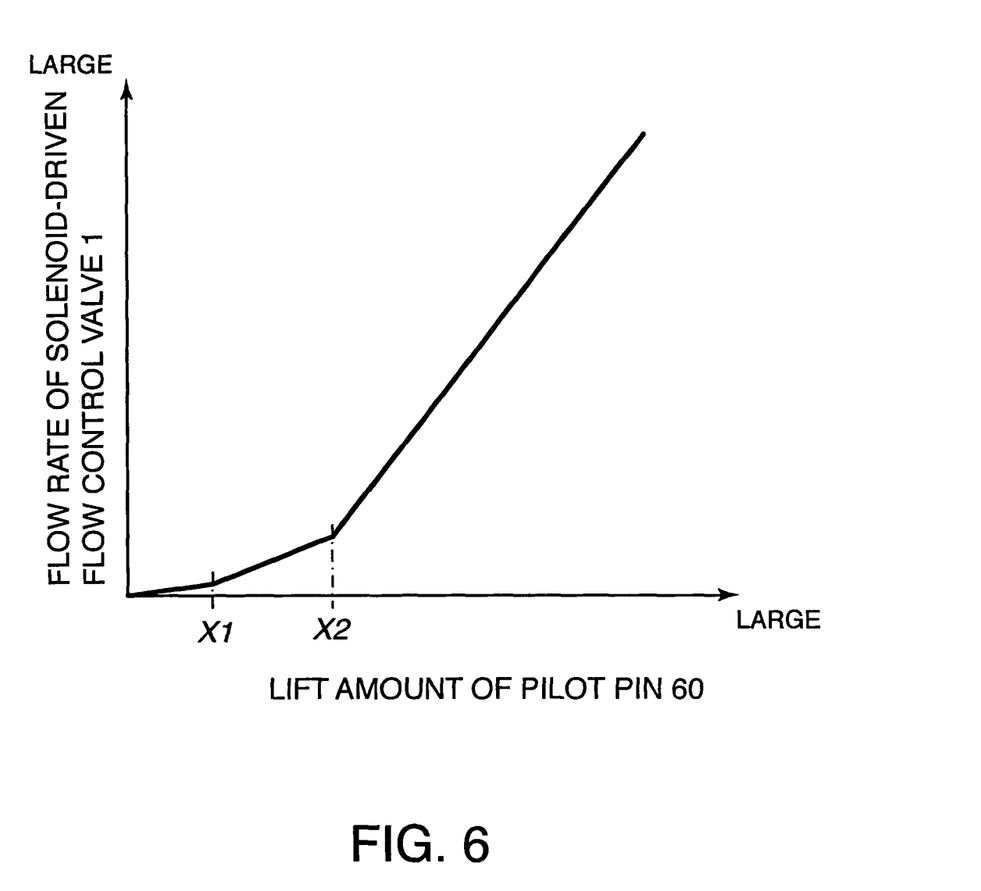
FIG. 6 is a diagram showing a relationship between a lift of a pilot pin and a flow rate of the solenoid-driven flow control valve.

Referring to FIG. 6, a flow characteristic of the solenoid-driven flow control valve 1 that performs the above operations will be described.

In the solenoid-driven flow control valve 1, a diameter of the main poppet 20 in the main valve V1 is larger than a diameter of the auxiliary poppet 40 in the auxiliary valve V2, and the diameter of the auxiliary poppet 40 is larger than a diameter of the pilot pin 60 in the pilot valve V3. Accordingly, a capacity of the main valve V1, or in other words a flow rate per unit lift amount, is greater than that of the auxiliary valve V2, and the capacity of the auxiliary valve V2 is greater than that of the pilot valve V3.

When the lift amount of the pilot pin 60 is zero, the three valves V1-V3 constituting the solenoid-driven flow control valve 1 are all closed, and therefore the flow rate of the solenoid-driven flow control valve 1 is zero.

When the lift amount of the pilot pin 60 is small, the working oil only flows through the pilot valve V3 of the solenoid-driven flow control valve 1. Since the capacity of the pilot valve V3 is small, the solenoid-driven flow control valve 1 increases the flow rate at a small increase rate relative to the increase in the lift amount of the pilot pin 60.

When the lift amount of the pilot pin 60 reaches X1, the auxiliary valve V2 opens, whereupon the solenoid-driven flow control valve 1 increases the flow rate at a larger increase rate relative to the increase in the lift amount of the pilot pin 60.

When the lift amount of the pilot pin 60 reaches X2, the main valve V1 also opens, whereupon the solenoid-driven flow control valve 1 increases the flow rate at a maximum increase rate relative to the increase in the lift amount of the pilot pin 60.

Hence, as the lift amount of the pilot pin 60 increases, the solenoid-driven flow control valve 1 raises the increase rate of the flow rate. At a low flow rate, the rate of change in the flow rate relative to the displacement of the pilot pin 60 is small, and therefore flow control can be performed precisely by controlling the energizing current of the solenoid. At a high flow rate, on the other hand, the rate of change in the flow rate relative to the displacement of the pilot pin 60 is large, and therefore flow control can be performed with favorable response by controlling the energizing current of the solenoid. Therefore, with the solenoid-driven flow control valve 1, response at a high flow rate and control precision at a low flow rate can be obtained.

Figure 2:
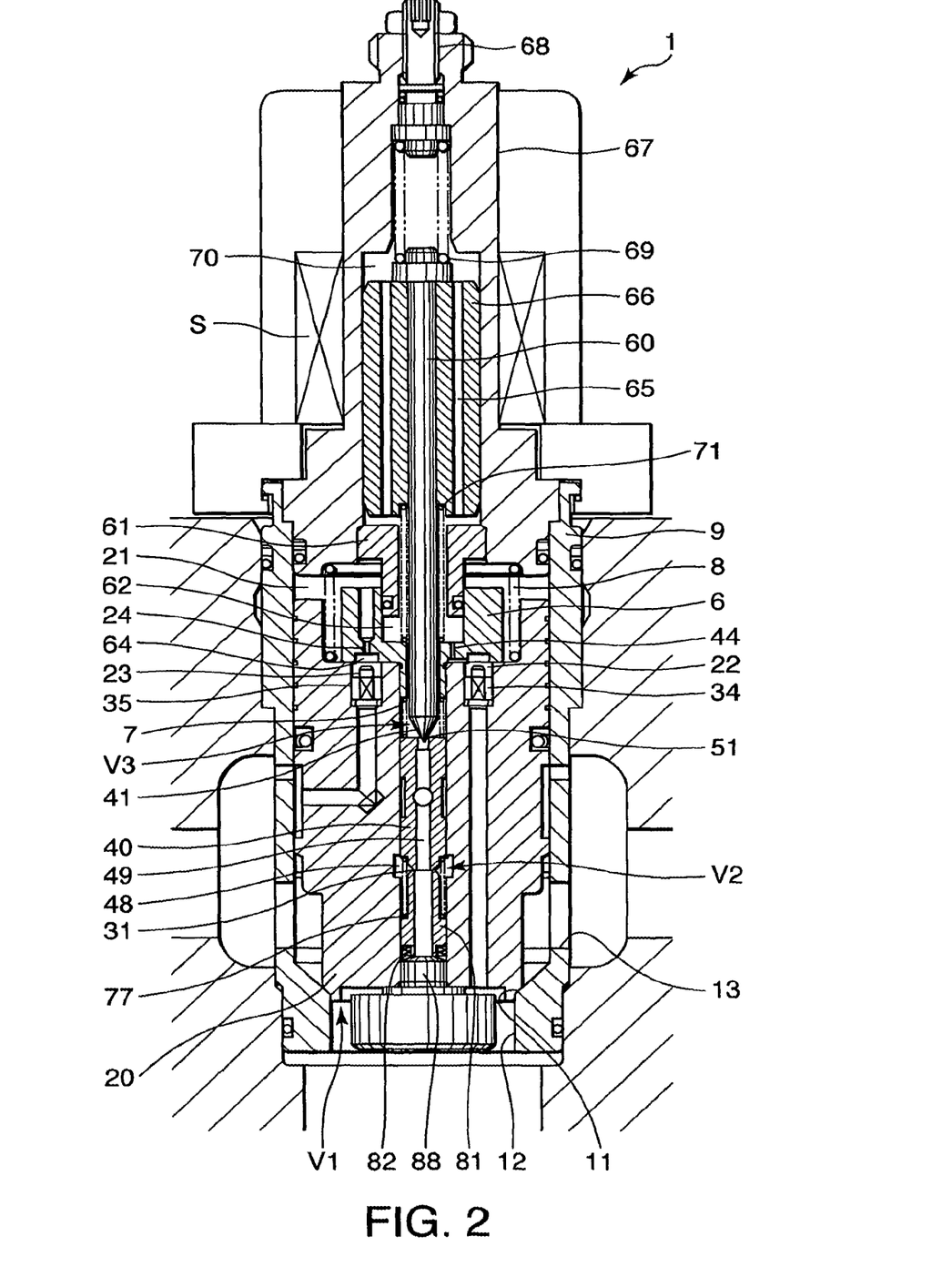
FIG. 2 is a longitudinal sectional view of the solenoid-driven flow control valve.
Figure 3:
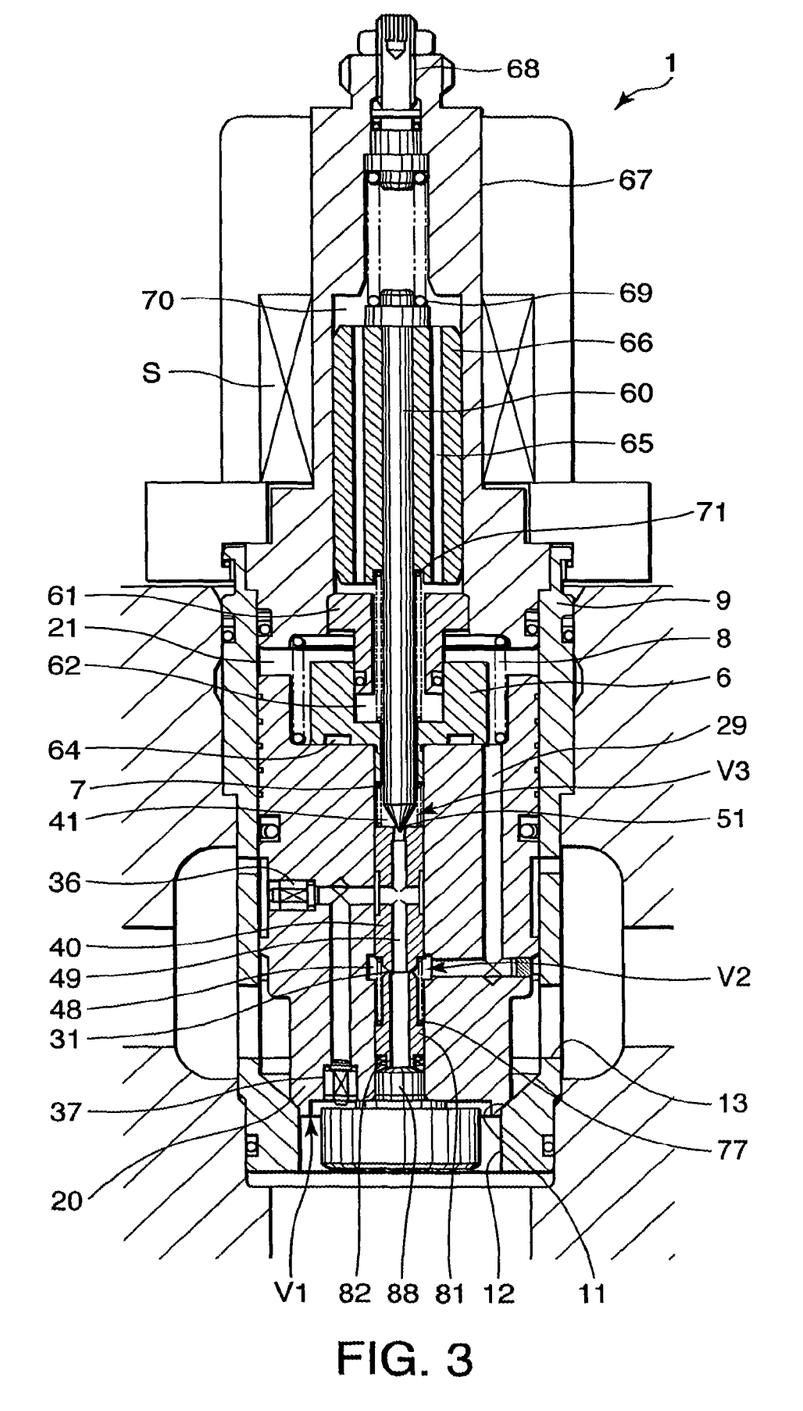
FIG. 3 is a longitudinal sectional view of the solenoid-driven flow control valve, cut along a vertical plane orthogonal to FIG. 2.

Referring to FIGS. 2 and 3, a specific constitution of the solenoid-driven flow control valve 1 will be described.

As noted above, by merging the passages 22 and 23, the two main pilot orifices 24A and 24B shown in FIG. 1 can be replaced by a single main pilot orifice and the two auxiliary pilot orifices 44A and 44B can be replaced by a single auxiliary pilot orifice.

For this purpose, a poppet head 6 is attached to an upper end of the main poppet 20, which is housed in the housing 9 to be free to slide in the axial direction, so as to face the main pilot chamber 21. The poppet head 6 invades the sliding hole of the auxiliary poppet 40, which is formed in the main poppet 20, from the main poppet chamber 21 and functions to separate the main pilot chamber 21 from the auxiliary pilot chamber 41.

An annular groove that faces the main poppet 20 is formed in the poppet head 6. This annular groove constitutes a pilot relay chamber 64. A head chamber 62 is formed in the interior of the poppet head 6. The head chamber 62 communicates with the auxiliary pilot chamber 41 via a gap between the pilot pin 60, which penetrates the poppet head 6, and a wall surface of the poppet head 6. The downstream passage 22 of the check valve 34 and the downstream passage 23 of the check valve 35 respectively open into the pilot relay chamber 64.

A main pilot orifice 24 that connects the pilot relay chamber 64 to the main pilot chamber 21 and an auxiliary pilot orifice 44 that connects the pilot relay chamber 64 to the head chamber 62 are formed in the interior of the poppet head 6. The auxiliary pilot orifice 44 connects the auxiliary pilot chamber 41 to the second port 13 without passing through the main pilot orifice 24.

With the constitution described above, the two main pilot orifices 24A and 24B shown in FIG. 1 are replaced by the single main pilot orifice 24 and the two auxiliary pilot orifices 44A and 44B are replaced by the single auxiliary pilot orifice 44. It should be noted that a flow passage sectional area of the main pilot orifice 24 is set to be larger than a flow passage sectional area of the auxiliary pilot orifice 44. The reason for this is that the flow rate of the auxiliary valve V2 passing through the main pilot orifice 24 is larger than the flow rate of the pilot valve V3 passing through the auxiliary pilot orifice 44.

A head sleeve 61 is fitted slidably to an upper end central portion of the poppet head 6 from above. The head chamber 62 is formed inside a sliding hole of the head sleeve 61 formed in the poppet head 6.

The pilot pin 60 penetrates the head sleeve 61 and the poppet head 6 to be seated on the pilot valve seat 51.

The pilot pin 60 is fixed to a plunger 66 above the head sleeve 61.

The plunger 66 is housed in a plunger chamber 70, which is formed inside a case 67 fixed to the upper end of the housing 9, to be capable of sliding in the axial direction. An adjuster screw 68 is screwed to an upper end of the case 67. A tip end of the adjuster screw 68 invades the case 67, and a return spring 69 is interposed between an invading end and the upper end of the pilot pin 60. The return spring 69 elastically supports the pilot pin 60 toward the pilot valve seat 51.

An opposing spring 71 is interposed between the plunger 66 and the poppet head 6. The opposing spring 71 elastically supports the pilot pin 60 in a lift direction from the pilot valve seat 51 via the plunger 66, or in other words in an opposite orientation to the return spring 69. A spring force of the opposing spring 71 is set to be smaller than a spring force of the return spring 69.

The opposing spring 71 is disposed to pass through a gap between the pilot pin 60 and the head sleeve 61. A pressure of the head chamber 62 is led into the plunger chamber 70 via this gap. This pressure also acts on the pilot pin 60 and a back surface of the plunger 66 via a through hole 65 formed in the plunger 66. The pressure of the head chamber 62 noted here is equal to the pressure of the auxiliary pilot chamber 41.

The pressure of the head chamber 62 acts on the plunger 66 from a vertical direction. Meanwhile, the pressure of the head chamber 62 acts on the pilot pin 60 and the pressure of the auxiliary pilot chamber 41 acts on the pilot pin 60 from below. The head chamber 62 communicates with the auxiliary pilot chamber 41 at all times, and therefore the pressure of the head chamber 62 is equal to the pressure of the auxiliary pilot chamber 41. However, when the pilot pin 60 is seated on the pilot valve seat 51, the pressure of the auxiliary pilot chamber 41 does not act on a tip end portion of the pilot pin 60 positioned on the inside of the pilot valve seat 51. In other words, a pressure-receiving surface area for the pressure that acts on the pilot pin 60 in an upward orientation is smaller than a pressure-receiving surface area for the pressure that acts on the pilot pin 60 in a downward orientation, and therefore downward pressure, or in other words pressure oriented toward the pilot valve seat 51, acts on the pilot pin 60. This pressure will be referred to as a pushing pressure generated by a differential pressure-receiving surface area.

A resultant force of a differential spring force between the return spring 69 and the opposing spring 71 and the pushing pressure generated by the differential pressure-receiving surface area acts on the pilot pin 60 as a valve closing force.

A solenoid S is disposed on an outer side of the case 67. The solenoid S exerts a magnetic force corresponding to an energizing current on the plunger 66 to displace the plunger 66 against the valve closing force acting on the pilot pin 60, whereby the pilot pin 60 fixed to the plunger 66 is lifted from the pilot valve seat 51.

Here, an action of the aforesaid pressure compensation sleeve 81 will be described.

When the valve closing force exerted on the pilot pin 60 increases in accordance with a pressure increase in the auxiliary pilot chamber 41, a larger energizing current must be supplied by the solenoid S in order to lift the pilot pin 60 from the pilot valve seat 51 and open the pilot valve V3.

Meanwhile, the valve closing force exerted on the pilot pin 60 is transmitted to the pressure compensation sleeve 81 via the auxiliary poppet 40. When the valve closing force exerted on the pilot pin 60 increases, the pressure compensation sleeve 81 displaces downward while deflecting the spring 82. Accordingly, the auxiliary poppet 40 displaces downward such that a seating position of the pilot pin 60 on the pilot valve seat 51 moves downward.

As a result of this movement of the seating position, the return spring 69 that biases the pilot pin 60 in the valve closing direction expands and the opposing spring 71 that biases the pilot pin 60 in the valve opening direction deflects. The spring force of the former is greater than that of the latter, and therefore the valve closing force acting on the pilot pin 60 decreases such that the effect of the pressure increase in the auxiliary pilot chamber 41 is canceled out. By means of this compensation action performed by the pressure compensation sleeve 81, a relationship between the energizing current of the solenoid S and the lift of the pilot pin 60 can be kept constant regardless of pressure variation in the auxiliary pilot chamber 41. The pressure compensation sleeve 81 and the spring 82 together constitute a pressure compensation mechanism.

The spring 82 is constituted by a plate spring. The sliding hole formed in the main poppet 20 for the auxiliary poppet 40 and the pressure compensation sleeve 81 is tightly closed by a plug 88. The spring 82 is interposed between the plug 88 and a lower end of the pressure compensation sleeve 81. It should be noted that the main poppet 20, the pressure compensation sleeve 81, the auxiliary poppet 40, and the pilot pin 60 are disposed coaxially.

Further, an opposing spring 77 is interposed between the pressure compensation sleeve 81 and the auxiliary poppet 40. The opposing spring 77 elastically supports the auxiliary poppet 40 in an opposite orientation to the auxiliary return spring 7. A spring force of the opposing spring 77 is set to be smaller than the spring force of the auxiliary return spring 7. The auxiliary poppet 40 is biased in a valve closing direction by the difference between the spring force of the auxiliary return spring 7 and the spring force of the opposing spring 77.

As described above, according to the solenoid-driven flow control valve 1, response to a high flow rate and high control precision at a low flow rate can both be obtained.

In the solenoid-driven flow control valve 1, the auxiliary poppet 40 of the auxiliary valve V2 is housed inside the main poppet 20 of the main valve V1 and the pilot valve seat 51 of the pilot valve V3 is formed in the auxiliary poppet 40, and therefore the auxiliary valve V2 and the pilot valve V3 are both housed inside the main poppet 20. Devices such as the orifices 24, 44 and the check valves 34, 35 are also housed inside the main poppet 20. Hence, the favorable effects described above can be obtained with a solenoid-driven flow control valve that has a substantially identical size to a conventional valve. Moreover, with the constitution described above, a passage length is reduced, and therefore pressure loss in the solenoid-driven flow control valve 1 is greatly suppressed. It should be noted, however, that the auxiliary poppet 40 may be provided on the outside of the main poppet 20.

Figure 7:
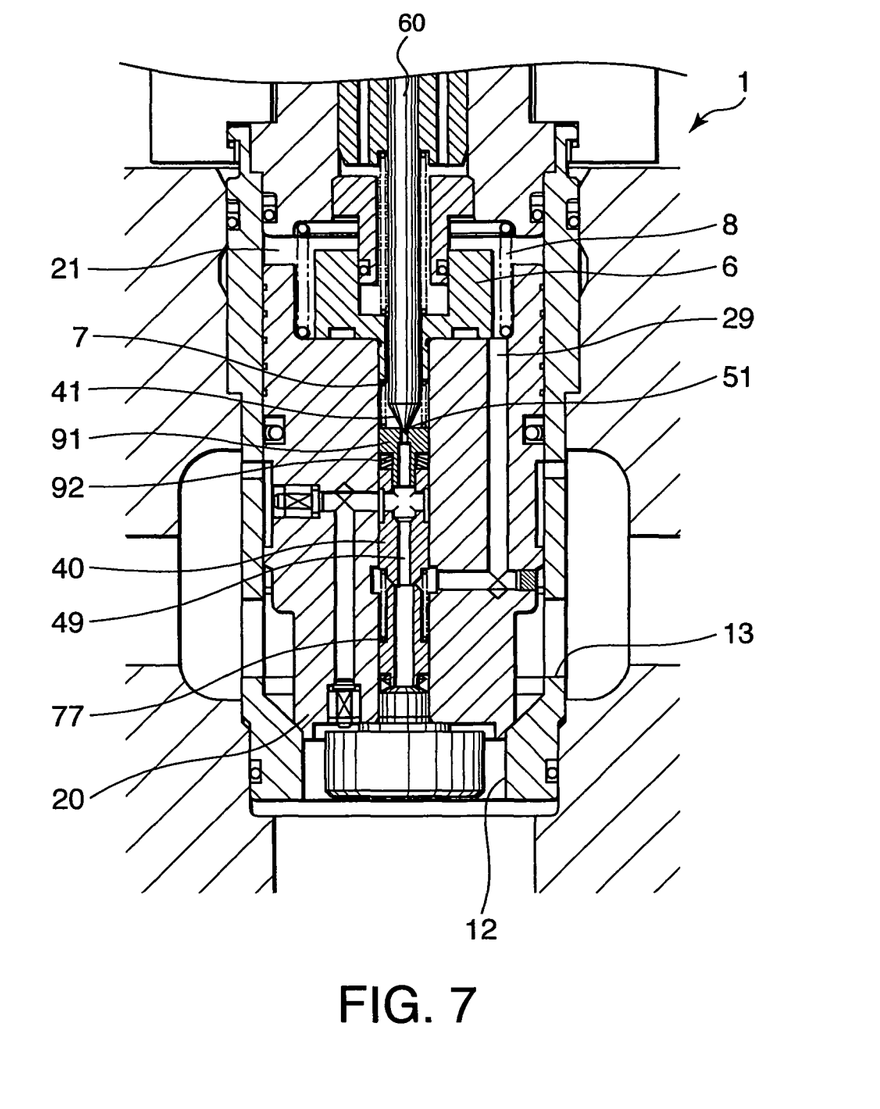
FIG. 7 is a longitudinal sectional view of a solenoid-driven flow control valve according to a second embodiment of this invention.

Referring to FIG. 7, a second embodiment of this invention will now be described.

In this embodiment, a pressure compensation sleeve 91 and a spring 92 are provided between the auxiliary poppet 40 and the pilot pin 60 in place of the pressure compensation sleeve 81 and the spring 82 according to the first embodiment. In this embodiment, the pressure compensation sleeve 91 and the spring 92 constitute the pressure compensation mechanism.

The hollow pressure compensation sleeve 91 is housed slidably in the sliding hole for the auxiliary poppet 40 formed in the main poppet 20. A tip end of the pressure compensation sleeve 91 invades the inner chamber 49 inside the auxiliary poppet 40 slidably. The spring 92 is constituted by a plate spring and interposed between the pressure compensation sleeve 91 and the auxiliary poppet 40. The pressure compensation sleeve 91 is elastically supported by the spring 92 in a direction heading away from the auxiliary poppet 40.

The pilot valve seat 51 is formed on an upper end of the pressure compensation sleeve 91, and the pilot pin 60 is seated on the pilot valve seat 51 from above. When the pilot pin 60 is lifted from the pilot valve seat 51, the auxiliary pilot chamber 41 above the pilot valve seat 51 communicates with the inner chamber 49 via a hollow portion of the pressure compensation sleeve 91.

The main poppet 20, the pressure compensation sleeve 91, the auxiliary poppet 40, and the pilot pin 60 are disposed coaxially.

All other constitutions are identical to their counterparts in the first embodiment.

In this embodiment, when the pressure of the auxiliary pilot chamber 41 rises, the pressure compensation sleeve 91 moves downward against the spring 92. Hence, similarly to the first embodiment, the return spring 69 that biases the pilot pin 60 in the valve closing direction expands and the opposing spring 71 that biases the pilot pin 60 in the valve opening direction deflects. As a result, the valve closing force acting on the pilot pin 60 decreases such that the effect of the pressure increase in the auxiliary pilot chamber 41 is canceled out. Hence, in this embodiment also, the relationship between the energizing current of the solenoid S and the lift of the pilot pin 60 can be kept constant regardless of pressure variation in the auxiliary pilot chamber 41.

Figure 8:
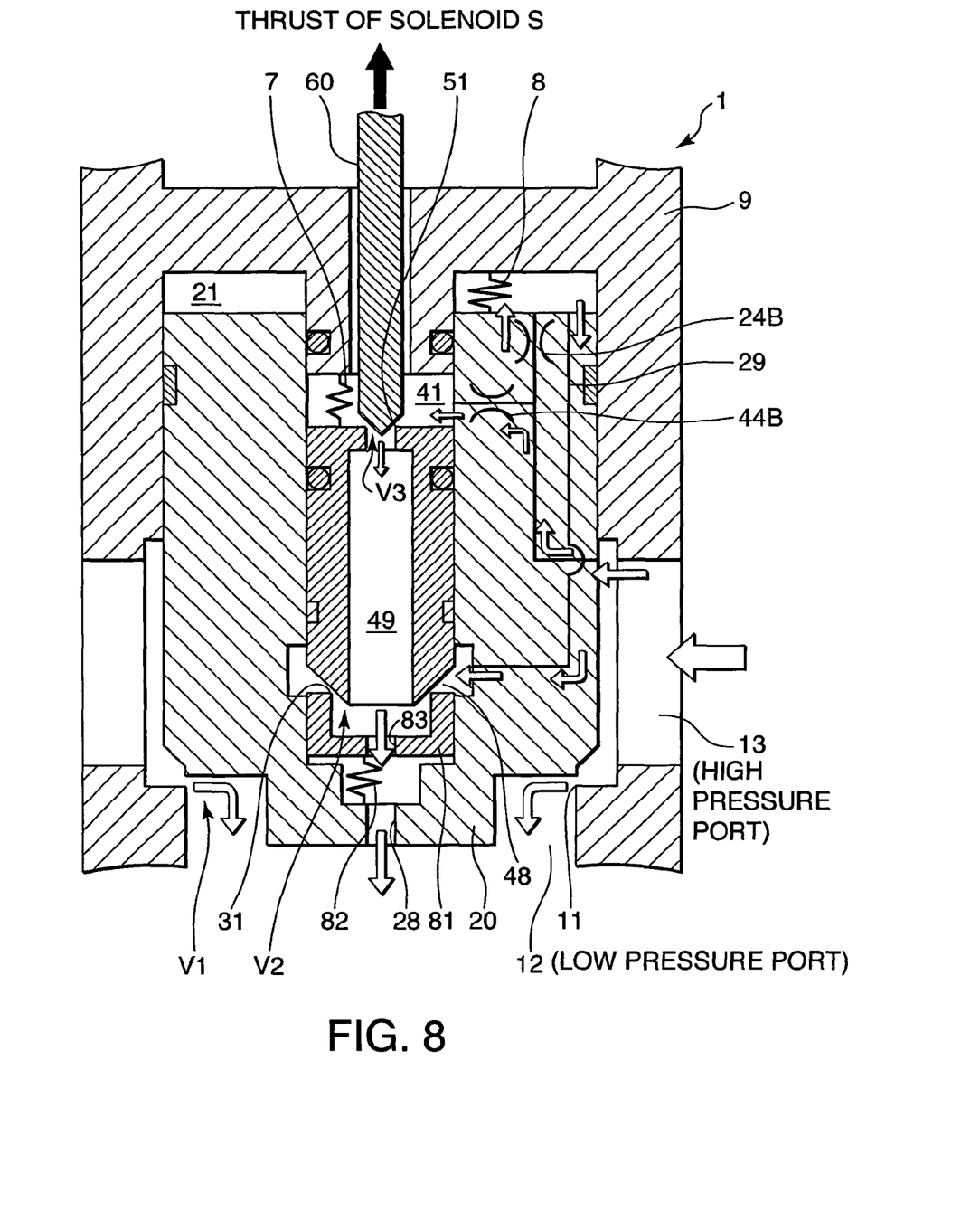
FIG. 8 is a schematic diagram of a solenoid-driven flow control valve according to a third embodiment of this invention.
Figure 9:
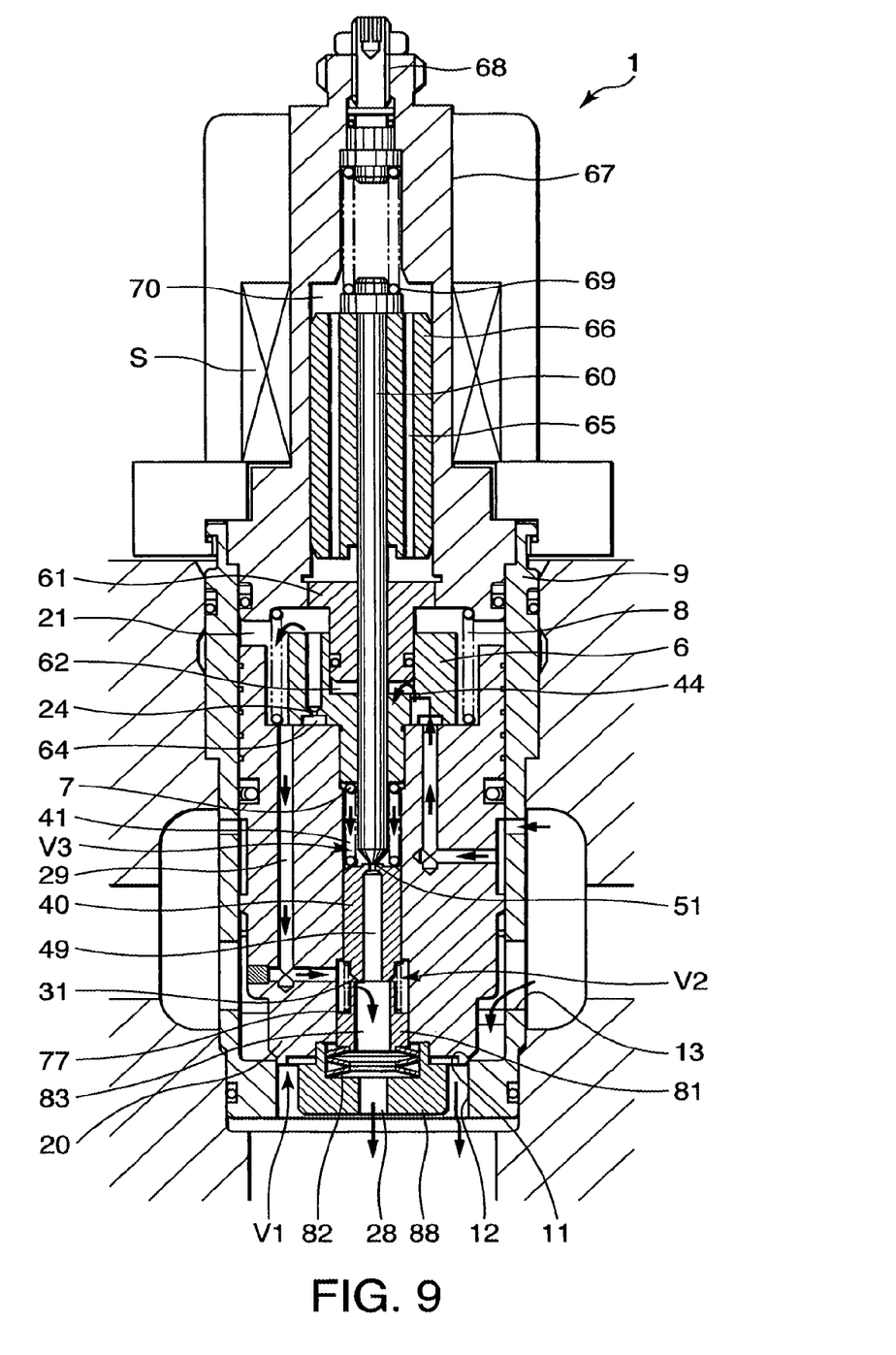
FIG. 9 is a sectional view of the solenoid-driven flow control valve according to the third embodiment of this invention.

Referring to FIGS. 8 and 9, a third embodiment of this invention will now be described.

Referring to FIG. 8, the solenoid-driven flow control valve 1 is a unidirectional flow control valve constituted with the aim of controlling the flow rate of working oil flowing from the second port 13 to the first port 12.

Three valves, namely the main valve V1, the auxiliary valve V2, and the pilot valve V3, are provided in the interior of the solenoid-driven flow control valve 1.

The main valve V1 includes the annular main valve seat 11 formed in the valve housing 9 opposite the first port 12, and the cylindrical main poppet 20 seated on the main valve seat 11 from the inside of the valve housing 9. The main poppet 20 is fitted to the valve housing 9 to be free to slide in the axial direction. The second port 13 opens into the valve housing 9 opposite a side surface of the main poppet 20.

The main poppet 20 seated on the main valve seat 11 includes an annular pressure-receiving portion that is exposed to the second port 13 on the outside of the main valve seat 11. The pressure of the second port 13 acts on the pressure-receiving portion to bias the main poppet 20 in a lift direction, or in other words a valve opening direction.

The main pilot chamber 21 is formed in the valve housing 9 to face the back surface of the main poppet 20. The main pilot chamber 21 is connected to the second port 13 via the main pilot orifice 24B.

The main poppet 20 is biased toward the main valve seat 11, or in other words in the valve closing direction, by the main pilot pressure of the main pilot chamber 21.

The main return spring 8 for biasing the main poppet 20 in the valve closing direction is interposed between the valve housing 9 and the main poppet 20.

When the valve opening force exerted on the main poppet 20 by the working oil pressure of the second port 13 exceeds the valve closing force exerted on the main poppet 20 by the main pilot pressure of the main pilot chamber 21 and the spring force of the main return spring 8, the main poppet 20 is lifted from the main valve seat 11.

The auxiliary valve V2 is a valve that controls the main pilot pressure of the main pilot chamber 21. The auxiliary valve V2 is provided on the inside of the main poppet 20.

The auxiliary valve V2 includes the annular auxiliary valve seat 31 provided on the inside of the main poppet 20, and the auxiliary poppet 40 that is fitted to the central portion of the main poppet 20 to be capable of sliding in the axial direction coaxially with the main poppet 20.

The pressure chamber 48 that surrounds the tip end of the auxiliary poppet 40 is formed on the outside of the auxiliary valve seat 31 on the inside of the main poppet 20. The pressure chamber 48 communicates with the main pilot chamber 21 at all times via the passage 29 formed in the main poppet 20. The pressure of the pressure chamber 48 biases the auxiliary poppet 40 in a lift direction from the auxiliary valve seat 31, or in other words a valve opening direction.

The auxiliary valve seat 31 is formed on the tip end of the cylindrical pressure compensation sleeve 81. The pressure compensation sleeve 81 is fitted into a sliding hole formed coaxially with the auxiliary poppet 40 on the inside of the main poppet 20, whereby the pressure compensation sleeve 81 is capable of sliding in the axial direction in a state where the auxiliary valve seat 31 faces the auxiliary poppet 40. The spring 82 that elastically supports the auxiliary valve seat 31 toward the auxiliary poppet 40 is interposed between the auxiliary valve seat 31 and the main poppet 20.

The cylindrical inner chamber 49 is formed on the inside of the auxiliary poppet 40. The inner chamber 49 communicates with the first port 12 at all times via a through hole 83 formed in a bottom surface of the pressure compensation sleeve 81 and a through hole 28 formed in a bottom portion of the main poppet 20. When the auxiliary poppet 40 is seated on the auxiliary valve seat 31, the pressure chamber 48 is tightly closed, but when the auxiliary poppet 40 is lifted from the auxiliary valve seat 31, the pressure chamber 48 communicates with the first port 12.

The auxiliary pilot chamber 41 is formed on the inside of the main poppet 20 so as to face the back surface of the auxiliary poppet 40. The auxiliary pilot chamber 41 is connected to the second port 13 via the auxiliary pilot orifice 44B.

The auxiliary poppet 40 is biased toward the auxiliary valve seat 31, or in other words in the valve closing direction, by the auxiliary pilot pressure of the auxiliary pilot chamber 41.

The auxiliary return spring 7 that biases the auxiliary poppet 40 in the valve closing direction is interposed between the housing 9 and the auxiliary poppet 40.

The pressure that is led from the main pilot chamber 21 to the pressure chamber 48 via the passage 29 acts on the auxiliary poppet 40 as a valve opening force. When the valve opening force exceeds the valve closing force exerted on the auxiliary poppet 40 by the pressure of the auxiliary pilot chamber 41 and the spring force of the auxiliary return spring 7, the auxiliary poppet 40 is lifted from the auxiliary valve seat 31.

When the auxiliary poppet 40 is lifted from the auxiliary valve seat 31, the pressure chamber 48 communicates with the first port 12. When the pressure chamber 48 communicates with the first port 12, the working oil in the main pilot chamber 21 flows out to the first port 12 through the passage 29, the pressure chamber 48, and the through holes 83 and 28. As a result, the pressure of the main pilot chamber 21 decreases.

The pilot valve V3 is a valve that controls the auxiliary pilot pressure of the auxiliary pilot chamber 41. The pilot valve V3 is provided between the auxiliary pilot chamber 41 and the inner chamber 49. The pilot valve V3 includes the pilot valve seat 51 formed to penetrate the upper end portion of the auxiliary poppet 40, and the pilot pin 60 that penetrates the auxiliary pilot chamber 41 longitudinally so as to be seated on the pilot valve seat 51.

When the pilot pin 60 is seated on the pilot valve seat 51, the pilot valve V3 blocks communication between the auxiliary pilot chamber 41 and the inner chamber 49. When the pilot pin 60 is lifted from the pilot valve seat 51, working oil in the auxiliary pilot chamber 41 flows out to the first port 12 from the inner chamber 49. As a result, the pressure of the auxiliary pilot chamber 41 decreases.

The pilot pin 60 is driven by the solenoid S shown in FIG. 9. A driving structure for driving the pilot pin 60 using the solenoid S is substantially identical to that of the first embodiment.

In FIGS. 8 and 9, a flow of working oil from the second port 13 to the first port 12 is indicated by arrows.

More specifically, when the pilot pin 60 is lifted from the pilot valve seat 51 through energization of the solenoid S, the working oil flows from the second port 13 into the auxiliary pilot chamber 41 through the auxiliary pilot orifice 44, then flows into the inner chamber 49 via the pilot valve V3, and then flows out to the first port 12 through the through hole 83 and the through hole 28. The pressure of the second port 13 is led into the main pilot chamber 21 via the main pilot orifice 24.

When the flow rate of the working oil that flows out to the first port 12 from the second port 13 via the auxiliary pilot chamber 41 increases, the pressure of the auxiliary pilot chamber 41 decreases relative to the pressure of the second port 13. As a result, the valve closing force acting on the auxiliary poppet 40 decreases, and when the pressure of the main pilot chamber 21, which acts on the pressure chamber 48 via the passage 29, exceeds the valve closing force acting on the auxiliary poppet 40, the auxiliary poppet 40 is lifted from the auxiliary valve seat 31, causing the auxiliary valve V2 to open.

When the auxiliary valve V2 opens, a flow of working oil is formed from the main pilot chamber 21 to the first port 12 via the passage 29, the pressure chamber 48, the inner chamber 49, and the check valve 37. In other words, with respect to the working oil flow from the second port 13 to the first port 12, a flow passing through the pilot valve V3 and a flow passing through the auxiliary valve V2 are formed.

When the flow rate of the working oil that flows from the second port 13 into the first port 12 via the auxiliary valve V2 increases, the pressure of the main pilot chamber 21 decreases relative to the pressure of the second port 13. As a result, the valve closing force acting on the main poppet 20 decreases, and when the valve opening force exerted on the main poppet 20 by the working oil in the second port 13 exceeds the valve closing force acting on the main poppet 20, the main poppet 20 is lifted from the main valve seat 11, causing the main valve V1 to open.

When the main valve V1 opens, a flow of working oil that flows from the second port 13 directly into the first port 12 through the gap between the main poppet 20 and the main valve seat 11 is formed. Hence, with respect to the working oil flow from the second port 13 to the first port 12, the flow passing through the pilot valve V3, the flow passing through the auxiliary valve V2, and a flow passing through the main valve V1 are formed.

Hence, in the solenoid-driven flow control valve 1 according to this embodiment also, a similar flow characteristic to that of the first embodiment, shown in FIG. 6, is obtained in relation to the flow of working oil from the second port 13 to the first port 12.

The contents of Tokugan 2008-312983, with a filing date of Dec. 9, 2008 in Japan, are hereby incorporated by reference.

Although the invention has been described above with reference to certain embodiments, the invention is not limited to the embodiments described above. Modifications and variations of the embodiments described above will occur to those skilled in the art, within the scope of the claims.

For example, a water-soluble substitute liquid may be used as the fluid instead of working oil.

This invention is not limited to the embodiments described above and may be subjected to various modifications within the scope of the technical spirit thereof.

INDUSTRIAL APPLICABILITY

The solenoid-driven flow control valve according to this invention is suitable for use in a machine or a vehicle that requires electric fluid flow control, such as an industrial machine or an agricultural machine.

The embodiments of this invention in which an exclusive property or privilege is claimed are defined as follows:

The invention claimed is:

1. A solenoid-driven flow control valve for controlling a flow rate of a fluid that flows from a second port to a first port in response to an energizing current, comprising:
    a main valve interposed between the second port and the first port, the main valve comprising a main valve seat and a main poppet facing the main valve seat to be capable of being seated thereon;
    a main pilot chamber exerting a fluid pressure on the main poppet toward the main valve seat;
    a main pilot orifice connecting the main pilot chamber to the second port;
    an auxiliary valve connecting the main pilot chamber to the first port, the auxiliary valve comprising an auxiliary valve seat and an auxiliary poppet facing the auxiliary valve seat to be capable of being seated thereon;
    an auxiliary pilot chamber exerting a fluid pressure on the auxiliary poppet toward the auxiliary valve seat;
    an auxiliary pilot orifice connecting the auxiliary pilot chamber to the second port, a sectional area of the auxiliary pilot orifice being set to be smaller than a sectional area of the main pilot orifice;
    a pilot valve connecting the auxiliary pilot chamber to the first port, the pilot valve comprising a pilot valve seat and a pilot pin facing the pilot valve seat to be capable of being seated thereon;
    a solenoid causing the pilot pin to move toward and away from the pilot valve seat in response to the energizing current; and
    a valve housing into which the main poppet is fitted to be capable of sliding,
    wherein the main poppet is formed in a cylindrical shape and the auxiliary poppet is fitted into an inner periphery of the main poppet concentrically and to be capable of sliding in an axial direction.

2. The solenoid-driven flow control valve as defined in claim 1, wherein the auxiliary valve seat is provided inside the main poppet, and an inner chamber connecting the pilot valve and the first port is formed inside the auxiliary poppet.

3. The solenoid-driven flow control valve as defined in claim 2, wherein the pilot pin is disposed coaxially with the auxiliary poppet.

4. The solenoid-driven flow control valve as defined in claim 3, further comprising a plunger that is fixed to the pilot pin to displace in response to a magnetic force of the solenoid.

5. The solenoid-driven flow control valve as defined in claim 3, further comprising a return spring biasing the pilot pin toward the pilot valve seat,
    wherein the solenoid is configured to lift the pilot pin from the pilot valve seat in response to the energizing current.

6. The solenoid-driven flow control valve as defined in claim 5, further comprising an opposing spring biasing the pilot pin in a direction heading away from the pilot valve seat, wherein a spring force of the opposing spring is smaller than a spring force of the return spring.

7. The solenoid-driven flow control valve as defined in claim 5, further comprising:
an oil chamber that biases the pilot pin toward the pilot valve seat using a pressure of the auxiliary pilot chamber; and
a pressure compensation mechanism that displaces the pilot valve seat in an expansion direction of the return spring in response to a pressure increase in the oil chamber.

8. The solenoid-driven flow control valve as defined in claim 7, wherein the pilot valve seat is formed in the auxiliary poppet, and the pressure compensation mechanism comprises
a pressure compensation sleeve, which forms the auxiliary valve seat facing the auxiliary poppet, fitted into the main poppet to be capable of sliding, and
a spring elastically supporting the pressure compensation sleeve toward the auxiliary poppet.

9. The solenoid-driven flow control valve as defined in claim 7, wherein the pressure compensation mechanism comprises a pressure compensation sleeve, one end of which is fitted inside the auxiliary poppet to be capable of sliding, and a spring elastically supporting the pressure compensation sleeve in an axial direction toward the auxiliary poppet, and the pilot valve seat is formed on another end of the pressure compensation sleeve.

10. The solenoid-driven flow control valve as defined in claim 1, further comprising a poppet head fixed to the main poppet to separate the main pilot chamber from the auxiliary pilot chamber.

11. The solenoid-driven flow control valve as defined in claim 10, further comprising an auxiliary return spring interposed between the poppet head and the auxiliary poppet to support the auxiliary poppet elastically toward the auxiliary valve seat.

12. The solenoid-driven flow control valve as defined in claim 10, wherein the main pilot orifice and the auxiliary pilot orifice are provided in the poppet head.

13. A solenoid-driven flow control valve for controlling a flow rate of a fluid that flows from a second port to a first port in response to an energizing current, comprising:
a main valve interposed between the second port and the first port, the main valve comprising a main valve seat and a main poppet facing the main valve seat to be capable of being seated thereon;
a main pilot chamber exerting a fluid pressure on the main poppet toward the main valve seat;
a main pilot orifice connecting the main pilot chamber to the second port;
an auxiliary valve connecting the main pilot chamber to the first port, the auxiliary valve comprising an auxiliary valve seat and an auxiliary poppet facing the auxiliary valve seat to be capable of being seated thereon;
an auxiliary pilot chamber exerting a fluid pressure on the auxiliary poppet toward the auxiliary valve seat;
an auxiliary pilot orifice connecting the auxiliary pilot chamber to the second port without passing through the main pilot orifice, a sectional area of the auxiliary pilot orifice being set to be smaller than a sectional area of the main pilot orifice;
a pilot valve connecting the auxiliary pilot chamber to the first port, the pilot valve comprising a pilot valve seat and a pilot pin facing the pilot valve seat to be capable of being seated thereon;
a solenoid causing the pilot pin to move toward and away from the pilot valve seat in response to the energizing current; and
a bidirectional flow control mechanism that permits working oil to flow from the first port to the second port while controlling the flow rate thereof when a pressure of the first port is higher than a pressure of the second port.

14. A solenoid-driven flow control valve for controlling a flow rate of a fluid that flows from a second port to a first port in response to an energizing current, comprising:
a main valve interposed between the second port and the first port, the main valve comprising a main valve seat and a main poppet facing the main valve seat to be capable of being seated thereon;
a main pilot chamber exerting a fluid pressure on the main poppet toward the main valve seat;
a first main pilot orifice connecting the main pilot chamber to the second port;
an auxiliary valve connecting the main pilot chamber to the first port, the auxiliary valve comprising an auxiliary valve seat and an auxiliary poppet facing the auxiliary valve seat to be capable of being seated thereon;
an auxiliary pilot chamber exerting a fluid pressure on the auxiliary poppet toward the auxiliary valve seat;
a first auxiliary pilot orifice connecting the auxiliary pilot chamber to the second port;
a pilot valve connecting the auxiliary pilot chamber to the first port, the pilot valve comprising a pilot valve seat and a pilot pin facing the pilot valve seat to be capable of being seated thereon;
a solenoid causing the pilot pin to move toward and away from the pilot valve seat in response to the energizing current; and
a bidirectional flow control mechanism that permits working oil to flow from the first port to the second port while controlling the flow rate thereof when a pressure of the first port is higher than a pressure of the second port, wherein the bidirectional flow control mechanism comprises:
a second main pilot orifice connecting the main pilot chamber to the first port;
a second auxiliary pilot orifice connecting the auxiliary pilot chamber to the first port;
a first check valve permitting a flow of working oil from the first port to the second main pilot orifice and the second auxiliary pilot orifice while prohibiting a flow in an opposite direction;
a second check valve permitting a flow of working oil from the second port to the first main pilot orifice and the first auxiliary pilot orifice while prohibiting a flow in an opposite direction;
a third check valve permitting a flow of working oil from the pilot valve and the auxiliary valve to the second port while prohibiting a flow in an opposite direction; and
a fourth check valve permitting a flow of working oil from the pilot valve and the auxiliary valve to the first port while prohibiting a flow in an opposite direction.

15. A solenoid-driven flow control valve for controlling a flow rate of a fluid that flows from a second port to a first port in response to an energizing current, comprising:
a main valve interposed between the second port and the first port, the main valve comprising a main valve seat and a main poppet facing the main valve seat to be capable of being seated thereon;
a main pilot chamber exerting a fluid pressure on the main poppet toward the main valve seat;
a main pilot orifice connecting the main pilot chamber to the second port;
an auxiliary valve connecting the main pilot chamber to the first port, the auxiliary valve comprising an auxiliary valve seat and an auxiliary poppet facing the auxiliary valve seat to be capable of being seated thereon;

an auxiliary pilot chamber exerting a fluid pressure on the auxiliary poppet toward the auxiliary valve seat;

an auxiliary pilot orifice connecting the auxiliary pilot chamber to the second port;

a pilot valve connecting the auxiliary pilot chamber to the first port, the pilot valve comprising a pilot valve seat and a pilot pin facing the pilot valve seat to be capable of being seated thereon;

a solenoid causing the pilot pin to move toward and away from the pilot valve seat in response to the energizing current;

a bidirectional flow control mechanism that permits working oil to flow from the first port to the second port while controlling the flow rate thereof when a pressure of the first port is higher than a pressure of the second port; and a poppet head fixed to the main poppet to separate the main pilot chamber from the auxiliary pilot chamber, wherein the bidirectional flow control mechanism comprises:

a pilot relay chamber formed between the main poppet and the poppet head;

a first check valve permitting a flow of working oil from the first port to the pilot relay chamber while prohibiting a flow in an opposite direction;

a second check valve permitting a flow of working oil from the second port to the pilot relay chamber while prohibiting a flow in an opposite direction;

a third check valve permitting a flow of working oil from the pilot valve and the auxiliary valve to the second port while prohibiting a flow in an opposite direction; and a fourth check valve permitting a flow of working oil from the pilot valve and the auxiliary valve to the first port while prohibiting a flow in an opposite direction, and the main pilot orifice connects the pilot relay chamber and the main pilot chamber while the auxiliary pilot orifice connects the pilot relay chamber and the auxiliary pilot chamber.

16. A solenoid-driven flow control valve for controlling a flow rate of a fluid that flows from a second port to a first port in response to an energizing current, comprising:

a main valve interposed between the second port and the first port, the main valve comprising a main valve seat and a main poppet facing the main valve seat to be capable of being seated thereon;

a main pilot chamber exerting a fluid pressure on the main poppet toward the main valve seat;

a main pilot orifice connecting the main pilot chamber to the second port;

an auxiliary valve connecting the main pilot chamber to the first port, the auxiliary valve comprising an auxiliary valve seat and an auxiliary poppet facing the auxiliary valve seat to be capable of being seated thereon;

an auxiliary pilot chamber exerting a fluid pressure on the auxiliary poppet toward the auxiliary valve seat;

an auxiliary pilot orifice connecting the auxiliary pilot chamber to the second port without passing through the main pilot orifice, a sectional area of the auxiliary pilot orifice being set to be smaller than a sectional area of the main pilot orifice;

a pilot valve connecting the auxiliary pilot chamber to the first port, the pilot valve comprising a pilot valve seat and a pilot pin facing the pilot valve seat to be capable of being seated thereon; and a solenoid causing the pilot pin to move toward and away from the pilot valve seat in response to the energizing current, wherein both the auxiliary pilot orifice and the main pilot orifice are disposed in the main poppet.

17. A solenoid-driven flow control valve for controlling a flow rate of a fluid that flows from a second port to a first port in response to an energizing current, comprising:

a main valve interposed between the second port and the first port, the main valve comprising a main valve seat and a main poppet facing the main valve seat to be capable of being seated thereon;

a main pilot chamber exerting a fluid pressure on the main poppet toward the main valve seat;

a main pilot orifice connecting the main pilot chamber to the second port;

an auxiliary valve connecting the main pilot chamber to the first port, the auxiliary valve comprising an auxiliary valve seat and an auxiliary poppet facing the auxiliary valve seat to be capable of being seated thereon;

an auxiliary pilot chamber exerting a fluid pressure on the auxiliary poppet toward the auxiliary valve seat;

an auxiliary pilot orifice connecting the auxiliary pilot chamber to the second port without passing through the main pilot orifice, a sectional area of the auxiliary pilot orifice being set to be smaller than a sectional area of the main pilot orifice;

a pilot valve connecting the auxiliary pilot chamber to the first port, the pilot valve comprising a pilot valve seat and a pilot pin facing the pilot valve seat to be capable of being seated thereon; and a solenoid causing the pilot pin to move toward and away from the pilot valve seat in response to the energizing current, wherein a flow rate of oil through the auxiliary valve that subsequently passes through the main pilot orifice is greater than a flow rate of oil through the pilot valve that subsequently passes through the auxiliary pilot orifice.

* * * * *